(12) United States Patent
Gastauer et al.

(10) Patent No.: US 8,500,215 B2
(45) Date of Patent: Aug. 6, 2013

(54) HYDRAULIC UNIT FOR SLIP-CONTROLLED BRAKING SYSTEMS

(75) Inventors: Heiko Gastauer, Losheim am See (DE); Petra Fischbach-Borazio, Frankfurt (DE); Axel Hinz, Neu-Anspach (DE); Uwe Greiff, Bad Homburg (DE)

(73) Assignee: Continental Teves AG & Co. oHG (DE)

( * ) Notice: Subject to any disclaimer, the term of this patent is extended or adjusted under 35 U.S.C. 154(b) by 433 days.

(21) Appl. No.: 12/738,146

(22) PCT Filed: Oct. 13, 2008

(86) PCT No.: PCT/EP2008/063718
§ 371 (c)(1),
(2), (4) Date: Apr. 15, 2010

(87) PCT Pub. No.: WO2009/053266
PCT Pub. Date: Apr. 30, 2009

(65) Prior Publication Data
US 2010/0231033 A1    Sep. 16, 2010

(30) Foreign Application Priority Data

Oct. 19, 2007  (DE) .......................... 10 2007 050 101
Jan. 19, 2008  (DE) .......................... 10 2008 005 279

(51) Int. Cl.
*B60T 13/16* (2006.01)
*B60T 8/40* (2006.01)

(52) U.S. Cl.
USPC . 303/10; 303/116.4; 303/119.3; 303/DIG. 10

(58) Field of Classification Search
USPC .................. 303/10–11, 6.01, DIG. 10, 113.1, 303/119.3, 116.4; 92/68, 72, 78; 417/273
See application file for complete search history.

(56) References Cited

U.S. PATENT DOCUMENTS

| | | | |
|---|---|---|---|
| 3,496,880 A * | 2/1970 | Wolff | 92/72 |
| 6,446,435 B1 | 9/2002 | Willmann et al. | |
| 6,764,285 B1 * | 7/2004 | Kellner | 417/470 |
| 2006/0138860 A1 | 6/2006 | Hinz et al. | |
| 2007/0110590 A1 | 5/2007 | Pabst et al. | |
| 2007/0176484 A1 | 8/2007 | Reuter et al. | |
| 2008/0298982 A1 | 12/2008 | Pabst et al. | |
| 2010/0202903 A1* | 8/2010 | Plewnia et al. | 417/273 |

FOREIGN PATENT DOCUMENTS

| | | |
|---|---|---|
| DE | 103 53 834 A1 | 6/2005 |
| DE | 10 2005 055 057 A1 | 5/2007 |
| DE | 102007033244 A1 * | 1/2009 |
| WO | WO 99/64283 | 12/1999 |
| WO | WO 2004/031013 A1 | 4/2004 |
| WO | WO 2005/050015 A1 | 6/2005 |
| WO | WO 2007/024636 A2 | 3/2007 |
| WO | WO 2007/057285 A1 | 5/2007 |
| WO | WO 2009/010191 A1 | 1/2009 |

* cited by examiner

Primary Examiner — Anna Momper
(74) Attorney, Agent, or Firm — RatnerPrestia (57) ABSTRACT

A hydraulic unit for slip-controlled braking systems has a plurality of receiving holes for transport devices associated with a plurality of hydraulic circuits bundled into groups, wherein the receiving holes are disposed at a distance from each in parallel with the upper side and a drive shaft having eccentrics located at the plane spacing for driving the transport devices. In order to provide a compromise optimized for manufacturing a small, convenient hydraulic unit, it is proposed that three theoretical planes (E1, E2, E3) are arranged in parallel to the upper side, each receiving two V-shaped receiving holes for transport devices disposed at an angle to each other, and that the drive shaft includes three separate eccentrics for driving the transport devices.

9 Claims, 6 Drawing Sheets

HYDRAULIC UNIT FOR SLIP-CONTROLLED BRAKING SYSTEMS

CROSS REFERENCE TO RELATED APPLICATIONS

This application is the U.S. National Phase application of PCT International Application No. PCT/EP2008/063718, filed Oct. 13, 2008, which claims priority to German Patent Application No. 10 2007 050 101.5, filed Oct. 19, 2007, and German Patent Application No. 10 2008 005 279.5, filed Jan. 19, 2008, the contents of such applications being incorporated by reference herein.

FIELD OF THE INVENTION

The invention relates to a hydraulic unit. A unit of this type is suitable preferably for use within an electrohydraulic braking system, a vehicle driver expressing a braking request which is implemented by the braking system, to some extent by-wire, by means of suitable actuators—preferably while taking account of the environmental conditions detected.

BACKGROUND OF THE INVENTION

In electrohydraulic braking systems, pressure is built up in wheel brakes either directly with the aid of a pressure source, usually in the form of displacement pump devices having pistons, or indirectly by means of a pressure accumulator. These mechatronic systems always include a complex electronic unit, equipped with extensive software, and a complex hydraulic unit, which is based on a hydraulic circuit diagram and ensures correct accommodation, arrangement and connection of a multiplicity of hydraulic and electrohydraulic components which are controlled by the electronic unit in a systematic manner.

The systems concerned must meet multiple requirements. In particular, they must be able to deal with novel application events with the required reliability. Small size and low weight are always aimed for. Operating feel, and in particular operating comfort with regard to noise and pulsation, are to be improved, since, according to tendency, the frequency of actuation of the hydraulic unit is increasing and the noise level in the vehicle interior is being lowered, especially when electric drives are used. The system must be compatible with hybrid drive systems, while reliable, large-volume manufacture, ultimately enabling the system to be marketed profitably, must nevertheless be possible.

Known from WO 2004/031013 A1, which is incorporated by reference, is a hydraulic unit for slip-controlled braking systems which has three piston-type pumping devices which are integrated in a receiving body for rows of electrohydraulic valves. Proposals are made for improving a hydraulic unit with a plurality of pumping devices of the type specified in such a manner that said unit is suitable for use in electrohydraulic braking systems, with efficient utilization of the installation space within the receiving body and with little operating noise. For this purpose the receiving bores for the pumping devices are integrated regularly at an angle of 120° to one another and in a particular relationship to the receiving bores for valve rows. The configuration is capable of improvement and the document contains no indications of the implementation of more than three pumping devices in the receiving body.

In order to combine reduced pulsation effects with a six-piston pump for a vehicle braking system which is simple to manufacture, there is proposed according to WO 2005/050015 A1, which is incorporated by reference, a section-plane based distribution of pumping devices bundled in groups, which are driven by means of two eccentrics which are axially spaced and phase-offset with respect to one another in a circumferential direction. Two pumping devices arranged in a first section plane of the receiving body form, together with a further pump unit arranged in a section plane offset parallel thereto, a common pressure source for supplying a hydraulic circuit of the vehicle braking system. A further such grouping of pumping devices is provided to supply a second hydraulic circuit. The phase-offset positive control of the pumping devices is configured in such a way that pulsation fluctuations can hardly be felt on the suction side. This compensation of pulsations by means of positive control by two eccentrics is achieved at the expense of positioning the receiving bores for the six pump units with irregular reciprocal spacing of their angles of rotation. Although this has the advantage in principle that only two receiving bores for pumping devices are not disposed parallel to a vertical or horizontal of the receiving body, nevertheless such prioritized treatment of the receiving bores for the pumping devices produces a spatially less economical positioning of the remaining components. This way of proceeding suffers, to a degree, from the disadvantage that all the other components, with their associated connecting channels, must be designed around the receiving bores of the pumping devices. This gives rise to correspondingly high cost and complexity of the drilling technology. This applies in particular to the bundling into groups of respective connections to a pressure path and to a suction path, the particular connection requiring a very large number of bore sections which must open into the receiving body from very diverse sides and must cross multiple times. One pressure path, in particular, comprises no fewer than five individual channel sections (36a-36e).

SUMMARY OF THE INVENTION

It is an object of the present invention to make available a hydraulic unit with a multi-piston pump which avoids the disadvantages of the prior art and makes possible an improved compromise for a drilling configuration.

The configuration proposed according to aspects of the invention consists substantially in arranging the relatively large-volume receiving bores for the pumping devices in respective V-shaped pairs at an angle to one another within three imaginary horizontal planes E1, E2, E3. Because the pumping devices are positioned within these horizontal planes E1-E3 to some extent in a stratified manner, but with only a relatively small offset from a common vertical plane V1, relatively extensive zones without receiving bores for pumping devices are produced in the receiving body, which to a large extent can be utilized entirely—without regard to the pumping devices—for arranging other components therein. Furthermore, a configuration bundled in this way makes possible a simplified drilling process together with a more compact construction.

The receiving bores for the pumping devices are provided with constant aperture angles in all the horizontal planes.

However, the aperture angle is offset alternately by a constant offset angle from one horizontal plane to another.

Dimensional control as well as programming of production machines is simplified if the drilling pattern of the receiving body is configured substantially symmetrically with respect to an imaginary vertical plane. The same is true in principle if the distances between the different horizontal planes are selected equally.

The number of chucking and rechucking operations is reduced if the receiving bores for the pumping devices of a hydraulic circuit each start uniformly from one side of the receiving body.

Furthermore, with a view to standardizing the drilling pattern it is especially advantageous if two each of the receiving bores of the pumping devices of a common hydraulic circuit are arranged perpendicularly to the upper face and congruently one above the other, and if one receiving bore for a pumping device of this hydraulic circuit is offset at an acute angle with respect to the other two receiving bores.

Very generally, each plane or section plane has two receiving bores, the receiving bores being arranged in each case in a V-formation at an angle to one another, the included angle being greater than 90° and not more than 180°. If the plane containing the receiving bore which is offset at an acute angle is arranged between the section planes of the receiving bores positioned congruently in a vertical direction, this makes possible an especially space-saving, compact construction.

The complexity and cost of drilling are further reduced if receiving bores for valves are arranged substantially perpendicularly above the receiving bores for pumping devices, so that, for a bundled group of pumping devices on the suction side, there are provided substantially linear, vertical channel sections which, starting from these valve receiving bores, enter the receiving body perpendicularly and open into the receiving bores of the pumping devices.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
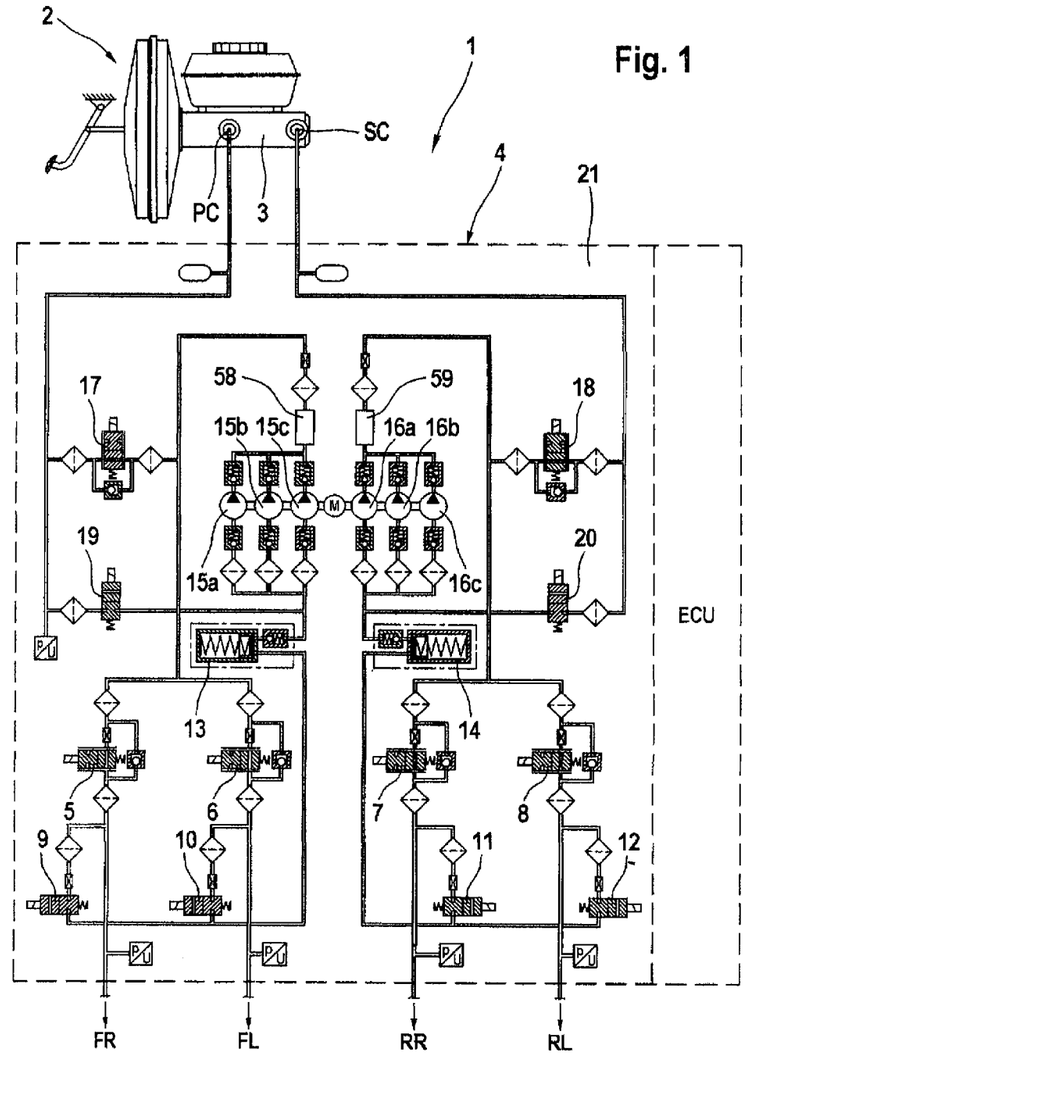
FIG. 1 is a schematic circuit diagram of a vehicle braking system with three pumping devices connected in parallel for each hydraulic circuit.

As shown in FIG. 1, an electrohydraulic braking system 1 comprises an actuating unit 2 with a master cylinder 3 and wheel brakes FR, FL, RR, RL organized in pairs in two different hydraulic circuits, which wheel brakes FR, FL, RR, RL are each connected both in a bundled manner and independently of one another either to a primary pressure chamber PC or to a secondary pressure chamber SC of the master cylinder 3.

Also located in the connection between master cylinder 3 and wheel brakes FR, FL, RR, RL is a hydraulic unit 4 with electronic control unit ECU which makes possible slip control for braking or drive. For this purpose the hydraulic unit 4 includes in a receiving body 21 currentlessly open inlet valves 5-8 and currentlessly closed outlet valves 9-12, which valves are connected in pairs upstream of the wheel brakes FR, FL, RR, RL.

Unnecessarily high pressure build-up within the ABS control cycles is reduced by activating the currentlessly closed outlet valves 9-12 and draining hydraulic fluid into respective low-pressure accumulators 13,14. In addition, three pumping devices 15a,b,c;16a,b,c are connected in parallel in each hydraulic circuit in order to return the hydraulic fluid from the low-pressure accumulators 13,14 in the direction of the master cylinder 3. The three pumping devices 15a,b,c;16a,b,c for each hydraulic circuit make possible not only a largely uniform, pulsation-free return function but also, in comparison to conventional single-piston pumps, an accelerated pressure build-up and increased volume flow.

In addition, in order to be able to build up pressure with the pumping devices 15a,b,c;16a,b,c in one or more wheel brakes FR, FL, RR, RL independently of the driver for the stability control processes or for comparable requested functions, a currentlessly open block valve 17,18 and a currentlessly closed change-over valve 19,20 are provided in each hydraulic circuit. The block valve 17,18 is used to block the normally open hydraulic connection between the master cylinder 3 and the wheel brakes FR, FL, RR, RL. By contrast, the change-over valve 19,20 makes it possible to change the suction path and the pressure path for the pumping devices 15a,b,c;16a,b,c in such a manner that, for the driver-independent control processes, fluid is drawn not from the low-pressure accumulators 13,14 but from the pressure chambers PC, SC of the master cylinder 3, in order not to pump the fluid in the direction of the master cylinder 3 but to build up pressure in the direction of the wheel brakes 15a,b,c;16a,b,c.

Figure 2A:
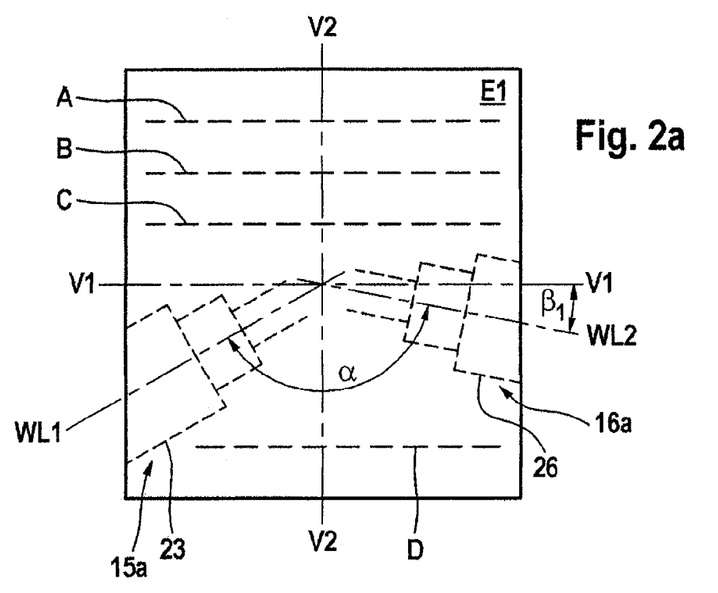
FIGS. 2a-2c show a section through a hydraulic unit with a total of six pumping devices, shown rotated in the drawing plane.
Figure 2B:
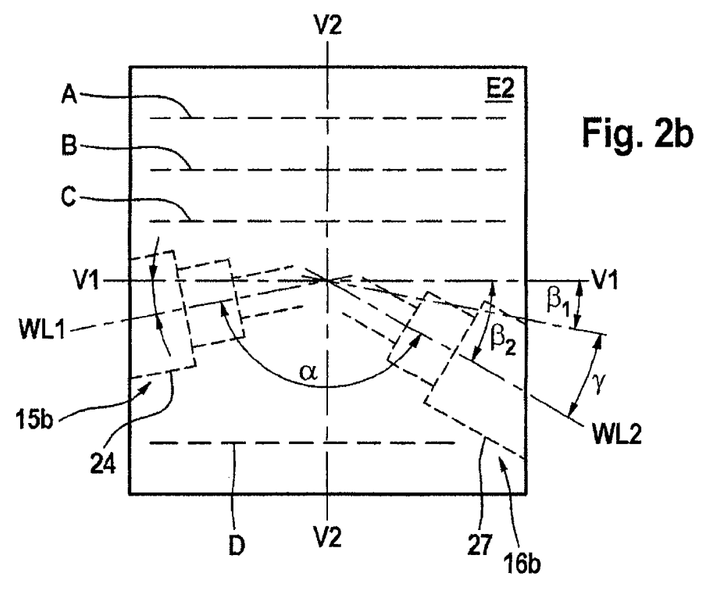
Figure 2C:
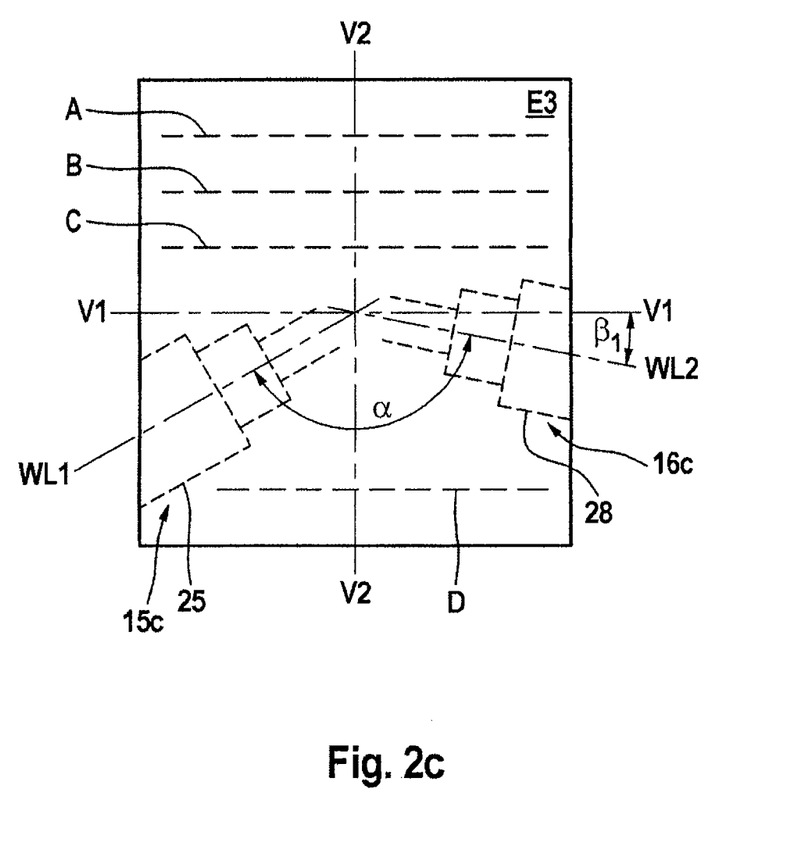
Figure 3:
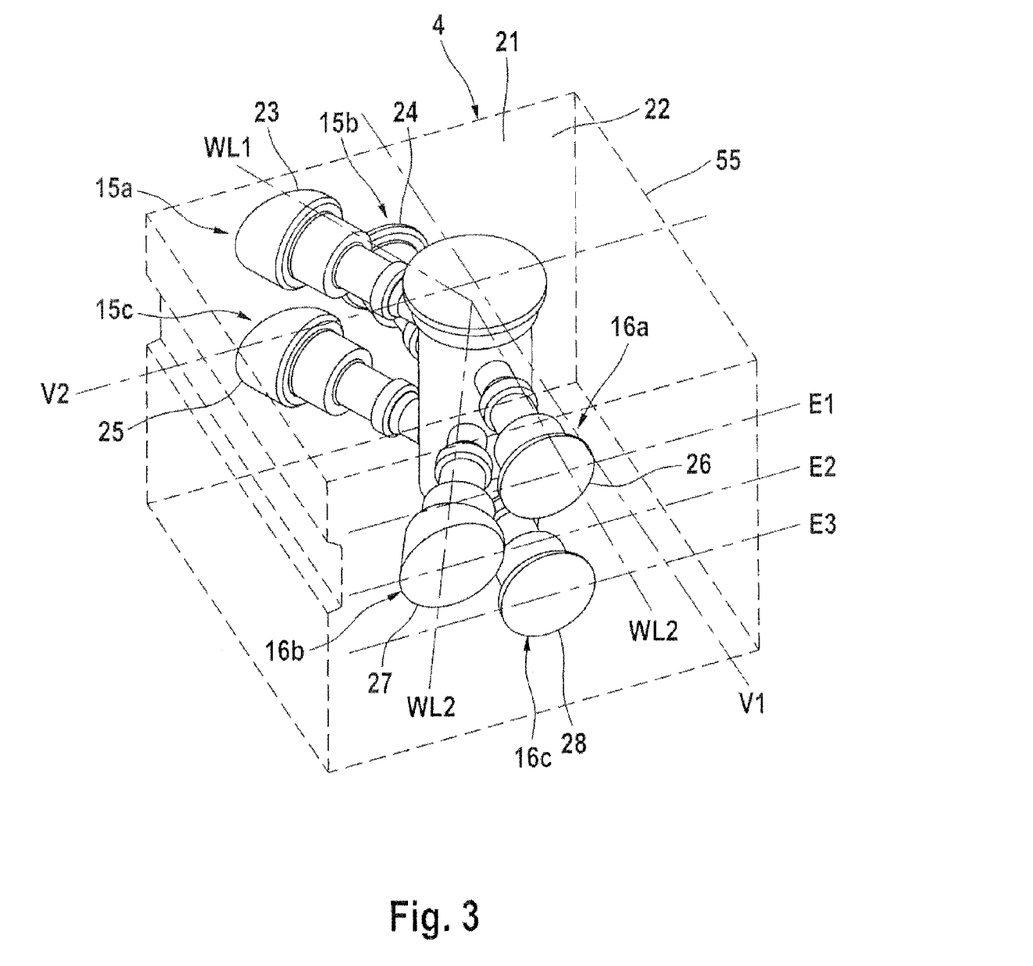
FIG. 3 shows a simplified hydraulic unit in a perspective schematic view.

The precise arrangement of the pumping devices 15a,b,c; 16a,b,c is apparent in detail from FIGS. 2 and 3. With regard to the configuration of the receiving body 21, in principle a plurality of horizontal planes E1, E2, E3 can be distinguished from a plurality of vertical planes V1, V2. For reasons of clarity, the corresponding planes E1, E2, E3 are indicated only by straight lines in the figures. The horizontal planes E1, E2, E3 each extend parallel to the upper face 22 of the receiving body 21. The vertical planes V1 and V2 are disposed perpendicularly to the upper face 22 and are arranged at right angles to one another. Although the planes mentioned are represented as lines in the drawing for reasons of clarity, it is self-evident that a planar extent is meant in each case.

Accordingly, all the receiving bores 23-28 for the pumping devices 15a,b,c;16a,b,c are arranged in layers in a total of three horizontal planes E1, E2 and E3. In addition, the pumping devices 15a,b,c;16a,b,c of a hydraulic circuit are bundled in respective groups on the right or left of the vertical plane V2. The receiving bores arranged inside the respective horizontal planes E1, E2, E3 are not located diametrically opposite one another, but are arranged in a V-formation with a constant aperture angle α of, for example, 148°. In this case the aperture angle α denotes in each case the angle with reference to the axes of movement WL1, WL2 in a horizontal plane of the pump pistons, which are driven by a common pump eccentric.

However, depending on the horizontal plane, the aperture angle α is rotated through an offset angle $\beta 1=6°$ or $\beta 2=26°$ (exemplary values in each case), the pumping devices of the horizontal planes E1 and E3 each being positioned with an identical offset angle $\beta 1$. The schematic sectional representations along the respective horizontal planes E1, E2 and E3 shown in FIGS. 2a to 2c serve to clarify this stratified distribution of the pumping devices.

The arrangement of the receiving bores 23-28 for pumping devices 15a,b,c;16a,b,c which has been described makes possible, to an extent, a bundling into groups, so that relatively large regions of the receiving body 21 are kept completely free of pumping devices 15a,b,c;16a,b,c, and for this reason can be utilized entirely for receiving any other components, channels or bores.

Figure 4:
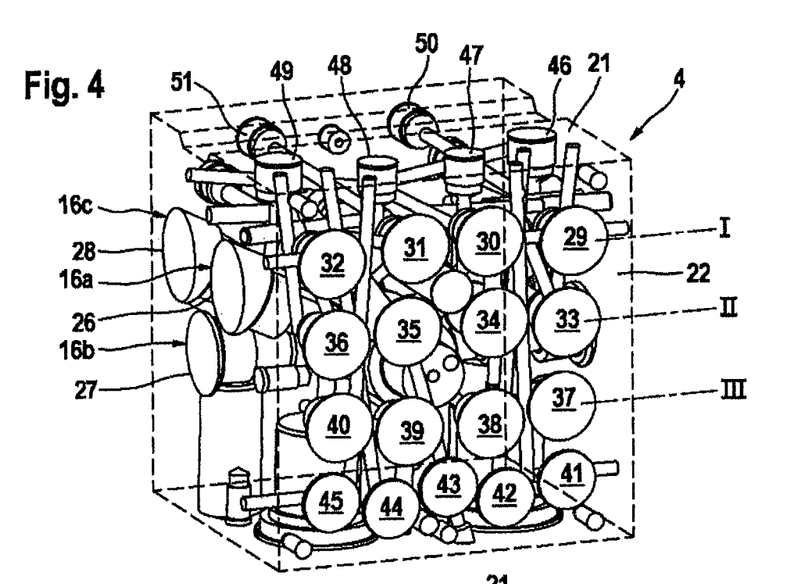
FIG. 4 is a perspective top view of an upper face of a hydraulic unit with receiving bores for valve rows.
Figure 5:
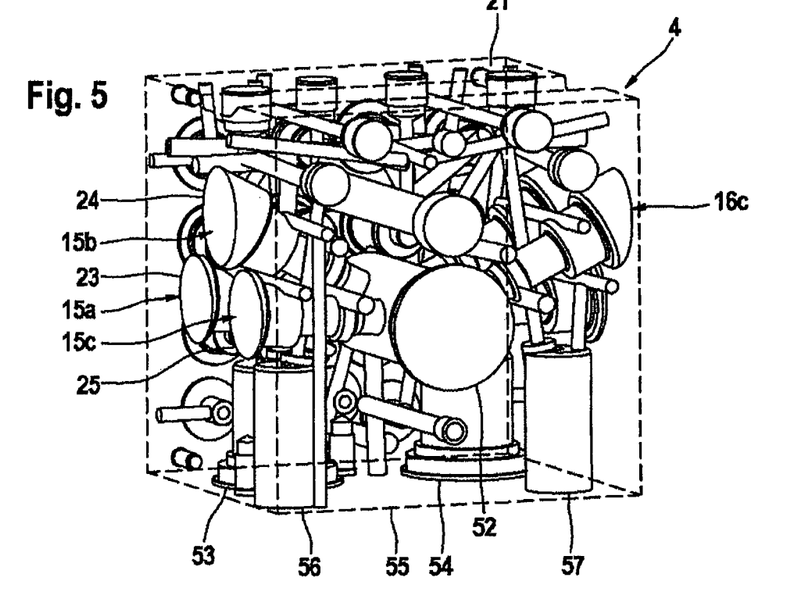
FIG. 5 is a perspective view of a hydraulic unit from below.

The perspectivally oriented FIGS. 4 and 5 illustrate a drilling concept with the individual receiving bores for the components of the receiving body 21 on the basis of the bundled arrangement of the receiving bores 23-28 for the pumping devices 15a,b,c;16a,b,c. While FIG. 4 is based, to an extent, on a primary top view of the upper face 22 of the receiving body 21, and makes visible the valve receiving bores 29-40 for the valve rows I, II and III, as well as separate receiving bores 41-45 in particular for hydraulic sensors, and also connections 46-49 for wheel brakes FR,FL,RL,RR as well as connections 50, 51 for the master cylinder 3, a primary view from below of the receiving body 21 rotated through 180° is shown in FIG. 5. This view from below makes visible, in particular, a receiving bore 52 for the drive shaft as well as receiving bores 53,54 for low-pressure accumulators 13,14. Common to both views is that they reveal the extensive axial symmetry in the drilling of the receiving body 21, in each case with respect to the vertical plane V2.

As a further, central feature of the receiving body 21, it should be added that the angles α, β between the receiving bores 23-28 for the pumping devices 15a,b,c;16a,b,c are arranged in such a manner that, according to tendency, all the working lines WL1, WL2 of the pumping devices 15a,b,c; 16a,b,c are oriented away from the end face 55 of the receiving body 21 from which the receiving bores 53,54 for the low-pressure accumulators 13,14, and the receiving bores 56,57 for damping chambers 58,59, open into the receiving body 21 substantially perpendicularly to the end face 55.

Figure 6:
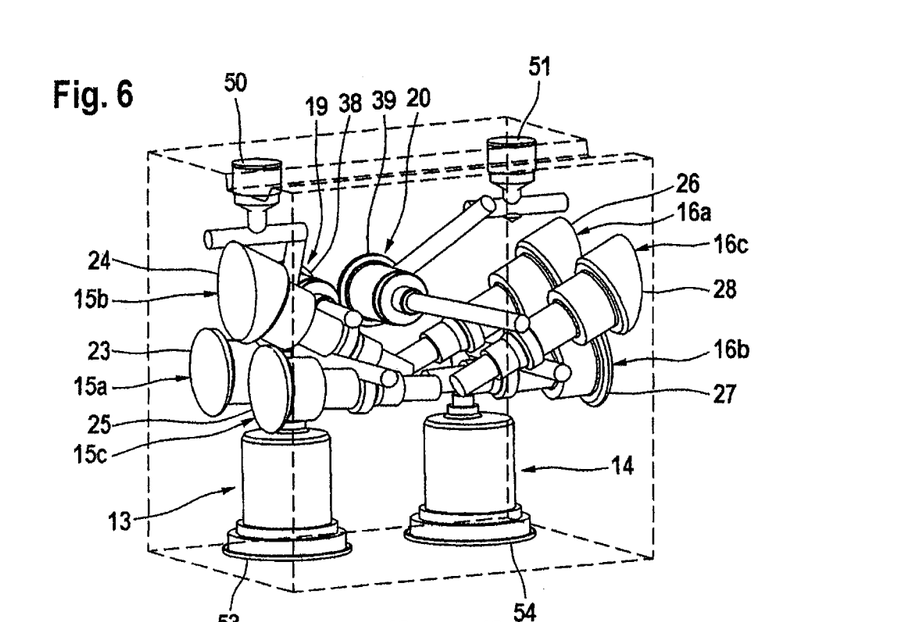
FIG. 6 is a perspective view of the suction path of the pumping devices.

An additional clear, perspective overview of the configuration of the suction path of the pumping devices, b,c; 16a,b,c is given in FIG. 6. As described previously, the change-over valve 19,20, in conjunction with the block valve 17,18, primarily makes it possible for fluid to be drawn both from a low-pressure accumulator 13,14 and from a master cylinder 3. For this purpose it is provided that for each hydraulic circuit one chamber each of the master cylinder 3 is connected via channel sections to a receiving bore 38,39 for the associated change-over valve 19,20. Furthermore, the receiving bore 53,54 of the associated low-pressure accumulator 13,14 is also connected via a channel to the receiving bore 38,39 for this change-over valve 19,20. Starting from the respective outlets of these change-over valves 19,20, there extend two channels, arranged substantially perpendicularly to the upper face 22, which lead to the suction region of the associated receiving bores 23-28 for the pumping devices 15a,b,c;16a, b,c. FIG. 6 shows clearly that in the present configuration a single channel makes possible in each case a common connection of two pumping devices 15a,c;16a,c arranged in alignment one above the other, while an adjacent channel essentially effects the connection of the pumping devices 15b,16b positioned in a somewhat angled manner.

Figure 7:
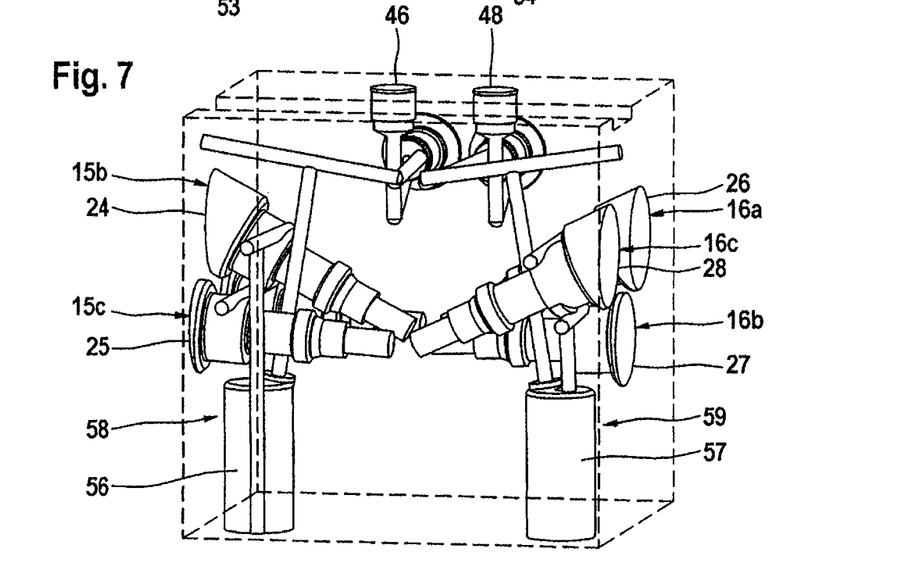
FIG. 7 is a perspective view of the pressure path of the pumping devices.

By contrast, FIG. 7 gives a clear overview of the comparatively simple connection of the pumping devices 15a,b,c;16a, b,c of the hydraulic circuits on the pressure side, each to a respective wheel connection 46,47;48,49. For this purpose a damping chamber 58,59 is provided, for each hydraulic circuit, between the pumping devices 15a,b,c;16a,b,c and the corresponding wheel connections 46,47;48,49. Each damping chamber 58,59 is connected via three channel sections to the respective wheel connection 46,47;48,49. The connection of the relevant pumping devices 15a,b,c;16a,b,c to the respective damping chamber 58,59 is effected by substantially two channels which open into the receiving body perpendicularly to the upper face and largely parallel to one another, and by a collecting channel which connects these channels and which, starting from the end face 55 having the damping chamber 58,59, is disposed substantially perpendicularly in the receiving body 21.

The invention claimed is:

1. A hydraulic unit for slip-controlled braking systems comprising:
    a parallelepipedic receiving body which receives at right angles to an upper face currentlessly open and currentlessly closed valves in a plurality of valve receiving bores of a first and second valve row;
    accumulator receiving bores arranged at a distance from and at right angles to the first and second valve rows;
    a plurality of pumping device receiving bores which are bundled in groups associated with a plurality of hydraulic circuits, the pumping device receiving bores being arranged parallel to the upper face at a distance from one another;
    a drive shaft with three separate eccentrics (X1,X2,X3) positioned with respect to imaginary horizontal planes (E1, E2, E3) for driving pumping devices;
    a plurality of pressure medium channels which connect the pumping device receiving bores to the valve receiving bores in order to establish a hydraulic connection between the pumping devices and wheel connections; and
    wherein the imaginary horizontal planes (E1, E2, E3) that are each arranged parallel to the upper face and each receive two pumping device receiving bores arranged in a V-formation with an aperture angle (α) for pumping devices,
    wherein two pumping device receiving bores of a common hydraulic circuit are arranged perpendicularly to the upper face and congruently in respective planes one above the other in a vertical direction, and wherein one pumping device receiving bore of the same hydraulic circuit is offset by an acute angle (γ) with respect to the two other pumping device receiving bores.

2. The hydraulic unit as claimed in claim 1, wherein the aperture angle (α) is configured to be constant over all the imaginary horizontal planes (E1,E2,E3).

3. The hydraulic unit as claimed in claim 2, wherein the aperture angle (α) is arranged offset by an offset angle (β1, β2).

4. The hydraulic unit as claimed in claim 3, wherein the offset angle (β1,β2) has two different values, and wherein the values alternate from imaginary horizontal plane (E1-E3) to imaginary horizontal plane (E1-E3).

5. The hydraulic unit as claimed in claim 1, wherein a drilling arrangement of the receiving body has drilling axes configured substantially symmetrically with respect to an imaginary vertical plane (V2).

6. The hydraulic unit as claimed in claim 1, wherein the distances between the different imaginary horizontal planes (E1,E2,E3) are substantially equal.

7. The hydraulic unit as claimed in claim 1, wherein the pumping device receiving bores of a hydraulic circuit each start uniformly from an end face of the receiving body.

8. The hydraulic unit as claimed in claim 1, wherein the imaginary horizontal plane (E2) with one of the pumping device receiving bores offset at an acute angle is arranged centrally between the imaginary horizontal planes (E1,E3) of the receiving bores positioned in alignment one above the other.

9. The hydraulic unit as claimed in claim 1, wherein valve receiving bores are arranged substantially perpendicularly above the pumping device receiving bores, such that, for a bundled group of the pumping devices on a suction side, substantially linear channel sections are provided, which channel sections, starting from the valve receiving bores, enter the receiving body perpendicularly and open into the pumping device receiving bores.

* * * * *